Feb. 16, 1954  K. A. OPLINGER ET AL  2,669,631
SWITCHING APPARATUS
Filed Feb. 13, 1952  2 Sheets-Sheet 1
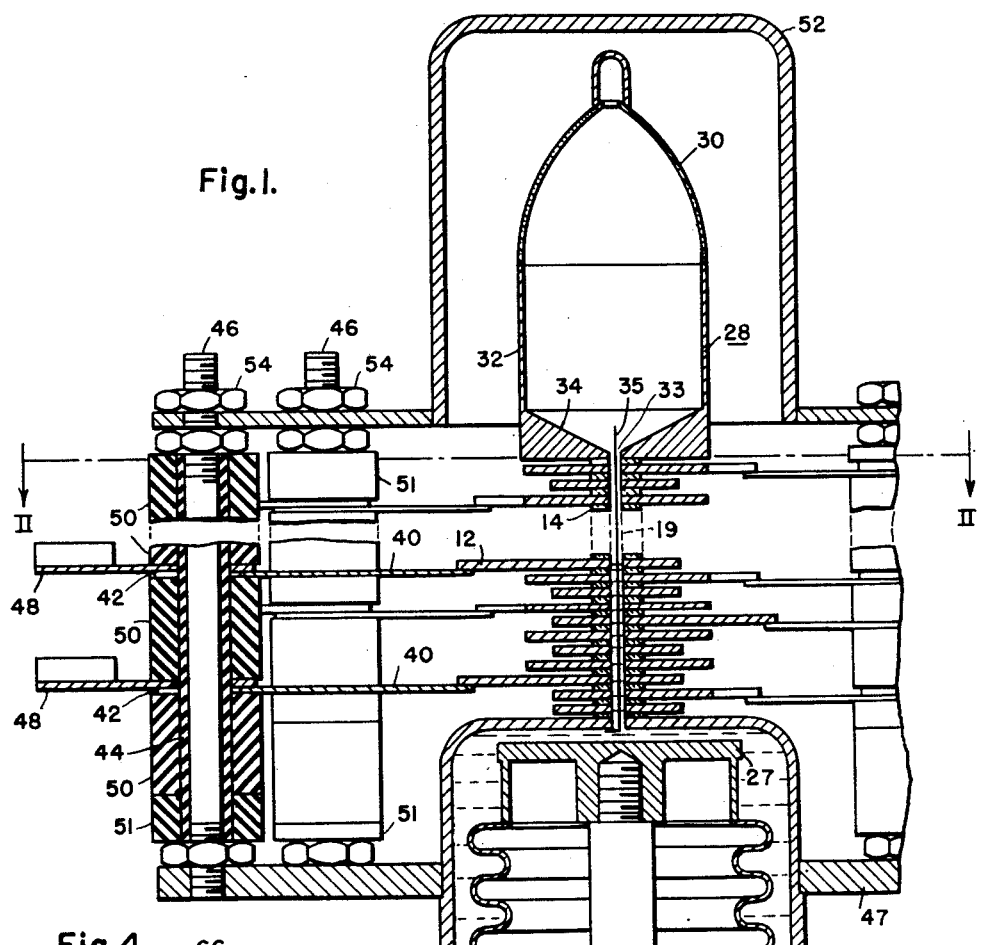
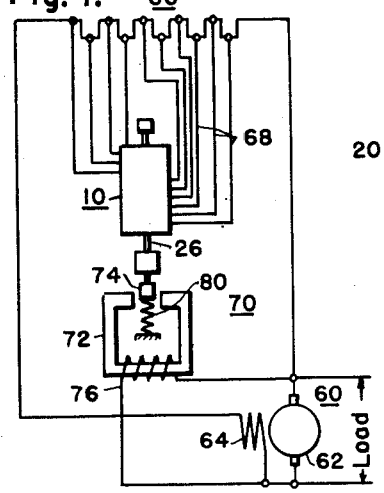
INVENTORS
Kirk A. Oplinger and
Ralph O. McIntosh.
BY
Ezra W. Savage
ATTORNEY Feb. 16, 1954   K. A. OPLINGER ET AL   2,669,631
SWITCHING APPARATUS
Filed Feb. 13, 1952   2 Sheets-Sheet 2

WITNESSES:
E. A. McCloskey
K. W. Thomas

INVENTORS
Kirk A. Oplinger and
Ralph O. McIntosh.
BY
Ezra D. Savage
ATTORNEY

Patented Feb. 16, 1954

2,669,631

UNITED STATES PATENT OFFICE 2,669,631

SWITCHING APPARATUS

Kirk A. Oplinger, Verona, and Ralph O. McIntosh, Pittsburgh, Pa., assignors to Westinghouse Electric Corporation, East Pittsburgh, Pa., a corporation of Pennsylvania Application February 13, 1952, Serial No. 271,342

3 Claims. (Cl. 200—152)

This invention relates to electrical switching apparatus and more particularly to such apparatus that utilizes mercury as a conducting medium.

Electrical switching apparatus having a plurality of alternately stacked conducting and insulating members having a passageway therethrough to permit mercury to bridge the conducting members has been used heretofore. However, these prior art devices are so constructed that the speed of response of the apparatus is inadequate.

An object of this invention is to provide for utilizing a predetermined volume of mercury to perform a step-by-step switching operation in order to get a predetermined speed of switching.

Another object of this invention is to so proportion the passageway in a mercury regulator switch as to effect a predetermined speed in step-by-step switching.

Still another object of this invention is to provide, in a new and improved regulator switch, for breaking the surface tension of any globule of mercury entrapped in a container disposed above a passageway and which is of greater diameter than the passageway, to thus permit the flow of the mercury globule into the passageway.

Other objects of this invention will become apparent from the following description, when taken in conjunction with the accompanying drawing, in which:

Figure 1 is a view in section of the switching apparatus embodying the teachings of this invention:

Fig. 4 is a schematic diagram illustrating the use of the switching apparatus embodying the teachings of this invention.

Figure 2:
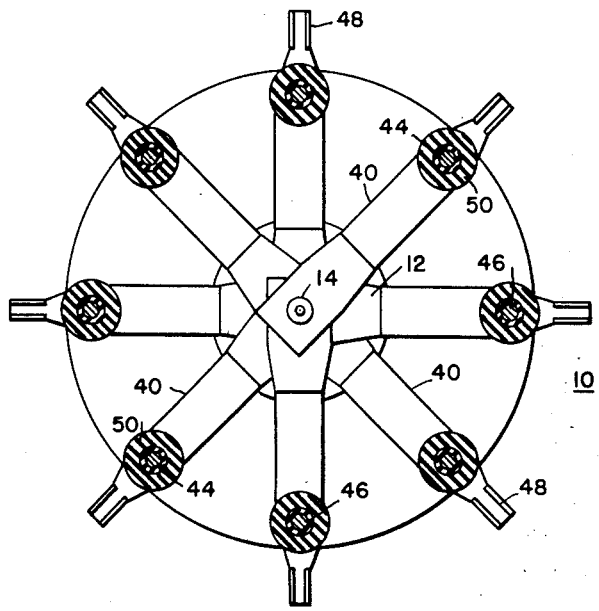
Fig. 2 is a view in section taken along the lines II—II of Fig. 1.
Figure 3:
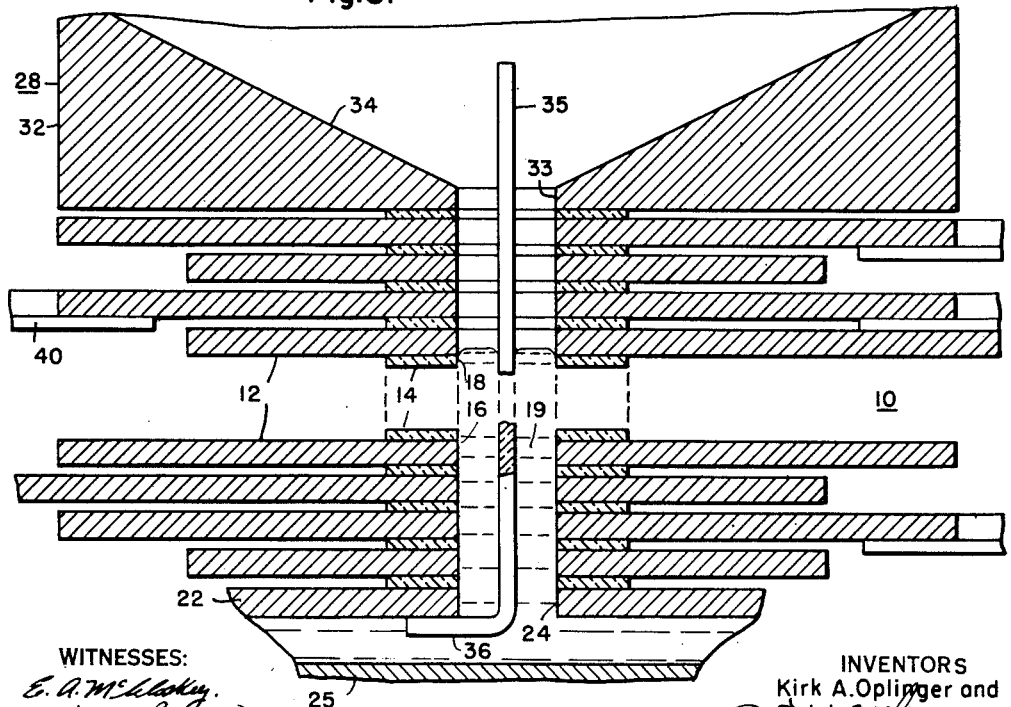
Fig. 3 is an enlarged view of the alternately spaced conductor members and insulating spacer members that are shown in Fig. 1.

Referring to Figs. 1 through 3, there is illustrated switching apparatus shown generally at 10 embodying the teachings of this invention. The switching apparatus 10 comprises a plurality of contact members or switch leaves 12 and thin insulating spacer members 14 stacked in alternate relationship. The contact members 12 may be made from any suitable conducting metal. Good results have been obtained by using an alloy known to the trade as "Kovar," which is an iron base alloy composed essentially of nickel, cobalt and iron with the nickel plus cobalt contained ranging from 40 to 55 per cent of the alloy when the cobalt ranges from 12 to 33 per cent, and the balance substantially iron, as described and claimed in Patent 1,942,260, issued January 2, 1934, to Howard Scott. In the preferred embodiment of this invention, the contact members 12 are extremely thin, being of the order of 0.20 of an inch thick in order that the total height of the stacked contact members 12 and spacer members 14 is held to a minimum and at the same time fine increments of step-by-step regulation are obtained. As can be more clearly seen in Fig. 3 of the drawing, each of the contact members 12 is provided with an opening 16, the purpose of which will be explained more fully hereinafter.

The spacer members 14 may be made of any suitable insulating material and in this embodiment are preferably formed of a ceramic insulating material. The ceramic spacer members 14 are also provided with a central opening 18, which corresponds to the diameter of the opening 16 in the contact members 12 and have a thickness equal to the spacing factor which it is desired to maintain between the contact members 12. As can be seen from the drawing, the contact members 12 and the spacer members 14 are vertically aligned so that their openings 16 and 18, respectively, cooperate to form a vertical passageway 19 through the alternately stacked contact members 12 and spacer members 14.

The diameter of the passageway 19 is critical, being of the order of between 0.03 inch and 0.094 inch to enable a mass of mercury of between 0.25 gram and 1.5 grams to bridge all of the contact members 12 to thereby obtain a high speed of switching. As can be appreciated, the mass of mercury required to bridge all of the contact members 12 depends upon the diameter of the passageway 19 as well as the height of the stacked assembly comprising the contact members 12 and the spacer members 14. On the other hand, the diameter of the passageway 19 depends upon the magnitude of the current that must be carried by the mercury 20 that flows through the passageway 19.

In order to prevent mercury 20 from escaping out through the alternately stacked contact members 12 and spacer members 14, when the mercury flows through the passageway 19, a bonding medium is disposed between each of the adjacent contact members 12 and spacer members 14. In the particular embodiment of the invention being described, glass is employed as the bonding medium. The glass is usually in the form of a glass washer (not shown) of a size suitable for placing it about the periphery of the spacer members 14. A preferred glass for this use is a boro-silicate glass having a coefficient of expansion approximating that of Kovar, and which readily wets the alloy of the contact members 12 and may be sealed thereto as well as to the ceramic spacer members 14. The glass employed in this embodiment consists of 64 per cent by weight of $SiO_2$, about 23 per cent by weight $B_2O_3$, about 7 per cent by weight NaO and about 5 per cent by weight $Al_2O_3$. Other examples of suitable boro-silicate glass which may be employed and different Kovar alloys which may be employed therewith within the range given hereinbefore may be readily ascertained by reference to Patent No. 2,062,335, issued December 1, 1936 to Howard Scott.

In preparing the contact members 12 for sealing, they are preferably pre-oxidized at a temperature of about 800° C. for three minutes prior to forming the stacked assembly. The stacked assembly comprising the contact members 12, the spacer members 14 and the glass washers is then placed in a heating furnace which has previously been flushed with nitrogen and the furnace temperature raised to about 1050° C., while maintaining a nitrogen atmosphere. The stacked assembly is held at this temperature for a period of time of about 30 minutes after which it is cooled to approximately 500° C., when hydrogen is admitted. The temperature is then reduced to about 450° C. from which temperature it is cooled gradually for a period of approximately one hour to prevent the formation of stresses due to temperature gradients.

As can be seen from Figures 1 and 3 of the drawings, the stacked assembly of contact members 12 and spacer members 14 is positioned and suitably secured to an inverted cup-shaped metallic member 22, which has an opening 24 in the top thereof which is in vertical alignment with the openings 16 and 18 of the contact members 12 and the spacer members 14, respectively.

In order to force the mercury 20 through a portion or all of the passageway 19, a bellows 25 is suitably connected to the bottom portion of the cup-shaped member 22. In this instance the bellows 25 is inverted and so disposed within the cup-shaped member 22 that a minimum amount of mercury 20 is utilized. Such being the case, the error due to changes in the temperature of the air surrounding the cup-shaped member 22 and the bellows 25, which effects an expansion or contraction of the mercury 20, is held to a minimum.

In order to actuate the bellows 25, an actuating rod 26 is suitably connected to the upper portion 27 of the bellows 25 and is responsive to an electrical or mechanical variable, which operation will be explained more fully hereinafter. For the purpose of forming a cushion for the mercury when it is forced into the passageway 19, and to prevent or reduce arcing between the edges of the spaced contact members 12 forming the wall of the passageway 19, a non-oxidizing gas and preferably a gas such as hydrogen is disposed in a container 28 which is in vertical alignment with the stacked assembly and disposed thereabove. The upper portion of the container 28 comprises a dome-shaped glass member 30 which is suitably sealed to a lower metallic cup-shaped member 32. The lower portion of the cup-shaped member 32 has an opening 33 disposed in the bottom thereof which is of the same diameter as the passageway 19, and which is in vertical alignment therewith.

As illustrated, the member 32 comprises a conical surface 34 which aids in returning any mercury that might escape into the container 28 in a direction towards the passageway 19. However, even though the conical shaped surface 34 returns this mercury in a direction towards the passageway 19, it still will not flow into the passageway 19. As can be realized, such a possible entrapment of mercury within the container 28 would greatly affect the accuracy of the switching apparatus 10. In order to overcome this difficulty, a rod-like member 35 is disposed in the passageway 19. The lower end of the rod-like member 35 has, as can be more clearly seen in Fig. 3 of the drawings, a turned-up portion 36 which prevents the rod 35 from floating up through the passageway 19 and thus permits the rod 35 to extend a predetermined distance above the opening 33, which distance is greater than the diameter of any globule of mercury that might be disposed in the container 28 and in the vicinity of the opening 33. Thus when a globule of mercury flows down the conical-shaped surface 34, it will strike the protruding rod 35, thus breaking its surface tension thereby permitting the flow of this globule of mercury into the passageway 19.

In the embodiment illustrated, the rod 35 is formed from a quartz fiber. However, it is to be understood that any suitable insulating material could be utilized, provided the rod has a diameter large enough to break the surface tension of the mercury globule without materially decreasing the volume of the passageway 19. The rod 35 may also be formed from a conducting material provided it is prevented by suitable means from interconnecting the conductor members 12. It is also to be understood that the rod 35 need not extend the whole length of the passageway 19, it being sufficient that the member 35 protrude a predetermined distance above the opening 33 of the container 28 so as to be capable of breaking up any mercury entrapped in the container 28 and thus permit its flow into the passageway 19 as hereinbefore mentioned. Any suitable means of anchoring the rod 35 may be utilized.

As hereinbefore mentioned, the contact members 12 are formed from Kovar, which is a relatively high resistance material. Therefore, in order to cut down the watts loss for the lead-in connections to the contact members 12, and to provide a flexible material that can be bent without damage to the sealed stacked assembly, a low resistance thin strip material 40 is welded to each of the contact members 12. In order to prevent arcing between alternate conductor members 12, each strip material 40 and its associated contact member 12 is spaced 135° apart from its adjacent strip material 40 and associated contact member 12.

The flexible strips 40 are provided with a spaded end 42 in order that each of these ends fits around an insulating tube 44 which in turn is disposed around a bolt 46, one end of which is threaded into a circular plate member 47 that is suitably secured to the cup-shaped member 22. Each spaded end 42 of the strips 40 has associated therewith a terminal member 48 one end of which is disposed around its associated tube member 44 so as to be in electrical contact with its respective strip material 40. In order to properly hold the strip members 40 in vertical spaced relation with respect to one another, a plurality of insulating spacer members 50 are disposed around each of the insulating tube members 44 and spaced between the adjacent strips 40 that are in the same vertical plane. One or more insulating spacer members 51 of different lengths are disposed around each of the bolts 46, the number of spacer members 51 and their length depending upon the particular tube member 44 and spacer member 50 that they are associated with. As can more clearly be seen from Fig. 2 of the drawings there are eight such vertical assemblies, each assembly comprising one of the bolts 46, one of the tube members 44 disposed therearound, a plurality of the spacer members 50 and one or more of the spacer members 51, each assembly being spaced 45 degrees apart on the horizontal from its adjacent assembly.

In order to protect the glass member 30 of the container 20 from injury, a metallic housing member 52 is disposed thereabove and held in assembled relation with respect to the remainder of the apparatus by means of the bolts 46 and their associated nuts 54, the bolts 46 and nuts 54 also serving to hold the circular plate 47, the spacer members 50 and 51, the tube member 44, the strips 40, and the terminal members 48 in assembled relationship.

Referring to Fig. 4, there is illustrated a regulating system which utilizes the switching apparatus of this invention and maintains the output voltage of a generator 60 substantially constant. In this instance, the generator 60 comprises an armature winding 62 and a shunt field winding 64 and it is driven by any suitable motor means (not shown). As illustrated, a rheostat 66 is connected in series circuit relation with the shunt field winding 64, the rheostat 66 being formed of a plurality of sections disposed to be cut into or shunted from a circuit with the field winding 64. In order to control the number of sections of the rheostat 66 that are cut into or shunted from the circuit with the field winding 64, the switching apparatus 10 of this invention is disposed with its staggered contact members 12 so connected by leads 68 to the different sections of the rheostat 66 that as the column of mercury is forced upwardly through the passageway 19, it progressively interconnects the contact members 12 to shunt additional sections of the rheostat 66.

In order to control the operation of the switching apparatus 10 in accordance with the output voltage of the generator 60, an electromagnet 70 is provided which comprises a core member 72, a movable armature member 74, and a winding 76 disposed in inductive relation with the core 72 and connected so as to be responsive to the output voltage of the generator 60. In this instance, the movable armature member 74 is mechanically connected to the actuating rod 26 so that the mercury will rise and fall in the passageway 19 of the switching apparatus 10 in accordance with the output voltage of the generator 60.

Assuming there is an increase in the output voltage of the generator 60 above its regulated value, the energization of the winding 76 increases, thus pulling the movable armature 74 downwardly and decreasing the pressure exerted on the bellows 25 by the actuating rod 26 to thus permit the mercury to fall within the passageway 19 to thereby cut in more sections of the rheostat 66 with the field winding 64. Such action decreases the energization of the field winding 64 and returns the output voltage of the generator 60 to its regulated value, the actuating rod 26 and the bellows 25 being returned to their upward position by means of a compression spring 30.

On the other hand, if there is a decrease in the output voltage of the generator 60 below its regulated value, the decreased energization of the winding 76 and the spring 80 will effect a movement of the bellows 25 in an upward direction, thus forcing the mercury higher in the passageway 19. With the mercury so positioned a greater number of the sections of the rheostat 66 are shunted to thereby increase the energization of the field winding 64 of the generator 60, and thus return its output voltage to the regulated value.

The switching apparatus 10 embodying the teachings of this invention has several advantages. For instance, it has a much greater speed of response than other types of mercury regulators heretofore utilized. Further, regulation can be accomplished by very fine increments in an increase or decrease in the voltage across the field winding 64 of the generator 60, since the switching apparatus 10 embodying the teachings of this invention is provided with a very large number of contact members 12 which are contained within a relatively small area. In addition, the bellows 24 is so disposed that minimum error is produced by changes in temperature of the air surrounding the bellows 25, thus increasing the overall efficiency of the switching apparatus 10.

We claim as our invention:

1. In a regulator switch, in combination, a plurality of contact members insulated from one another and sealed in a stack of predetermined height, the stack having a passageway extending longitudinally therethrough, an upper mercury container disposed at and opening into one end of the passageway and a lower mercury container opening into the other end of the passageway, means disposed in the lower container responsive to predetermined conditions to cause the mercury to rise in the passageway to interconnect the contact members in the stack, the passageway having a diameter of not more than 0.094 inch to enable the mercury to bridge all of the contact members and thus obtain a predetermined speed in the functioning of the regulator switch, and a member which has a smaller diameter than the passageway and which is disposed in the passageway so as to protrude into the upper mercury container in order to break up any of the mercury in the upper container of greater diameter than 0.094 inch and thus permit its passage into the passageway.

2. In a regulator switch, in combination, a plurality of contact members insulated from one another and sealed in a stack of predetermined height, the stack having a pasageway extending longitudinally therethrough, an upper mercury container disposed at and opening into one end of the passageway and a lower mercury container opening into the other end of the passageway, means disposed in the lower container responsive to predetermined conditions to cause the mercury to rise in the passageway to interconnect the contact members in the stack, the passageway having a diameter of between 0.03 and 0.094 inch to enable a mass of mercury of the order of between 0.25 and 1.5 grams to bridge all of the contact members to thereby obtain a predetermined speed in the functioning of the regulator switch, and a member, non-wettable by mercury, which has a smaller diameter than the passageway and which is disposed in the passageway so as to protrude into the upper mercury container in order to break up any of the mercury in the upper container of greater diameter than 0.094 inch and thus permit its passage into the passageway.

3. In a regulator switch, in combination, a plurality of contact members insulated from one another and sealed in a stack of predetermined height, the stack having a passageway extending longitudinally therethrough, an upper mercury container having a conical shaped member disposed at and opening into one end of the passageway and a lower mercury container opening into the other end of the passageway, means disposed in the lower container responsive to predetermined conditions to cause the mercury to rise in the passageway to interconnect the contact members in the stack, the passageway having a diameter of between 0.03 and 0.094 inch to enable a mass of mercury of the order of between 0.25 and 1.5 grams to bridge all of the contact members to thereby obtain a predetermined speed in the functioning of the regulator switch, and a member, non-wettable by mercury, which has a smaller diameter than the passageway and which is disposed in the passageway so as to protrude into the upper mercury container in order to break up any of the mercury in the upper container of greater diameter than 0.094 inch and thus permit its passage into the passageway.

KIRK A. OPLINGER.
RALPH O. McINTOSH.

References Cited in the file of this patent

UNITED STATES PATENTS

| Number | Name | Date |
|---|---|---|
| 1,638,814 | Epstein | Aug. 9, 1927 |
| 2,281,044 | Oplinger | Apr. 28, 1942 |
| 2,307,535 | Oplinger | Jan. 5, 1943 |